Fig. I.

INVENTOR.
Harvey C. Mittendorf
BY
Carlton F. Bryant
Attorney

Oct. 25, 1949.  H. C. MITTENDORF  2,485,762
SURGE TANK FOR ELECTRIC BOILERS

Filed July 25, 1947  2 Sheets-Sheet 2

INVENTOR.
Harvey C. Mittendorf
BY
Carlton F. Bryant
Attorney

Patented Oct. 25, 1949

2,485,762

UNITED STATES PATENT OFFICE 2,485,762

SURGE TANK FOR ELECTRIC BOILERS

Harvey C. Mittendorf, East Orange, N. J., assignor, by mesne assignments, to Combustion Engineering-Superheater, Inc., a corporation of Delaware Application July 25, 1947, Serial No. 763,699

2 Claims. (Cl. 219—40)

My invention relates to electric steam generating units of the water-immersed electrode type and it has special reference to auxiliary surge tanks for the electrode-containing boilers of such units.

Broadly stated, the object of my invention is to improve the performance of electric steam generators that have surge tanks for facilitating electrode-immersion control by receiving excess water from the boiler at times and by returning needed water to the boiler at other times.

A more specific object is to minimize variation in tank water level during interchange of water between the boiler and the tank.

Another object is usefully to reclaim the heat content of the bleed water that is withdrawn from the electric boiler to keep water conductivity within proper limits.

In practicing my invention I attain the foregoing and other objects by positioning the surge tank above the boiler's top water level with the tank axis substantially horizontal; by placing inside the surge tank a heating conduit which becomes submerged by the water contained in the tank; and by passing through that conduit the hot bleed water from the boiler whereby to transfer the heat therein to the tank water surrounding the conduit and thereby prevent escape of same from the steam generator.

Other advantages of this improved surge tank organization will become evident from the following description of an illustrative form thereof when taken in conjunction with the accompanying drawings wherein.

The illustrated electric boiler

Figure 1:
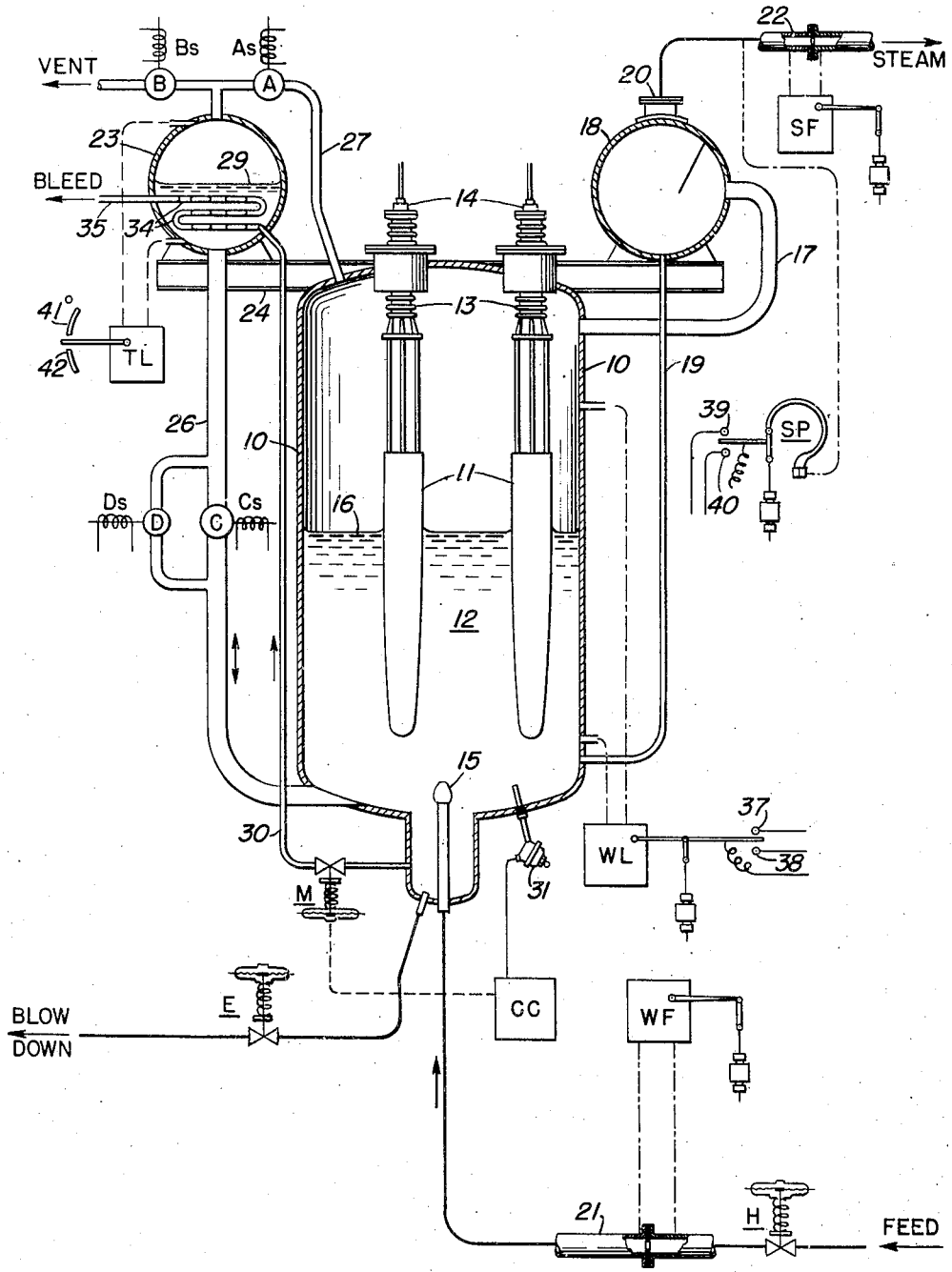
Fig. 1 represents an electric steam generator equipped with a surge tank to which the improvements of this invention have been applied.

The electric steam generator represented comprises a main boiler drum 10 designed for mounting with its axis vertical; one or more electrodes 11 projecting downwardly into the boiler water 12 from the upper drum head where insulator supports 13 hold them in place; and terminals 14 for establishing connections with an electrical power circuit (not shown). Further utilized inside boiler drum 10 may be an immersed neutral or ground plate (omitted from Fig. 1 to make the drawing more simple) which surrounds the electrodes and increases the area of heating current flow through the water.

Water enters this main boiler drum 10 at the bottom through a nozzle 15 and fills the lower portion of the drum to some intermediate level 16, thereby causing partial immersion of electrodes 11. Current from the electrodes flowing through the water 12 converts same into steam. The steam leaves the main drum through one or more riser tubes 17 and enters the generator's dry drum 18. Here the moisture is separated out and returned to the main drum through one or more drain tubes 19. The dry steam then leaves the generator through outlet 20 in the top of dry drum 18.

In a boiler of this water-immersed electrode type, the amount of steam generated depends on the amount of current passing through the water and this, in turn, depends on the area of current path through the water and the conductivity of the water. The water area through which the current passes is determined by the depth of immersion of the electrodes 11. Therefore, by maintaining a constant resistance of water, the amount of steam generated may be governed by varying the level of the water in main boiler drum 10.

Primary control of this water level may be accomplished in various ways, all of which are outside the scope of the present invention. For this reason only partial representation has here been made of an illustrative arrangement which contemplates that feed water admission valve H in supply conduit 21 will have its opening adjusted (through pneumatic apparatus not shown) jointly by boiler steam pressure as measured by device SP connected with the steam outlet conduit 22, by rate of steam flow through that conduit as measured by device SF, by water level in boiler 10 as measured by device WL, and by rate of feed water flow into the boiler as measured by device WF; all in a manner more fully disclosed and described by copending application Serial No. 763,700 filed by Mittendorf and Paulison on July 25, 1947.

The water surge tank

Recent practice is to supplement the foregoing basic steam generator parts by an auxiliary surge tank into which excess water from the boiler drum 10 may be temporarily stored to effect quick lowerings in the drum level 16, and from which needed water may be drawn to effect quick rises in that drum level. The use of such a surge tank avoids the wastage of heat content which accompanies blow-down discharge of excess water through the customary valve E; it also minimizes disturbance of water conductivity when the main drum level must be either raised or lowered.

Figure 2:
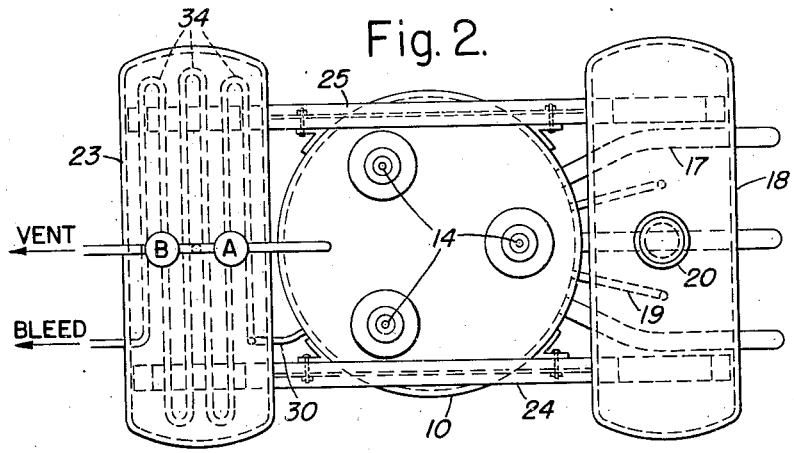
Fig. 2 is a top plan view of the apparatus of Fig. 1.

Such a surge tank organized in accordance with my invention is shown at 23 in Figs. 1–2. As illustrated this tank takes the form of a cylindrical drum whose length is considerably greater (of the order of several times) its diameter, and it is positioned above boiler 10's top water level with the tank axis substantially horizontal. The advantage of this horizontal position is outlined later. Support for the tank in the represented position above one side of main drum 10 may be provided in any suitable manner, as by a pair of I beams 24—25 which spacedly pass over the main drum top to extend beneath the two surge tank ends at one side of the main drum and beneath the dry drum 18 at the main drum's opposite side.

In prior art surge tank organizations known to me the surge tank has been positioned vertically, instead of horizontally as here shown, and same has been mounted at about the same elevation as the main drum 10, instead of substantially thereabove as here indicated.

Interchange of water between my improved surge tank 23 and the main boiler drum 10 is effected at proper times through a conduit 26 which interconnects the surge tank bottom with the main drum's lower portion; transmission of steam pressure from the main drum to the surge tank is effected at proper times under the control of valve A through a conduit 27 that enters the tank's top; venting of the tank interior to the atmosphere is effected at proper times under the control of a companion valve B; and flow of water between boiler 10 and surge tank 23 is governed by valves C (large) and D (small) in conduit 26.

Water from the main boiler drum 10 is normally stored in surge tank 23 to some intermediate level 29. This tank 23 is of such capacity that emptying of all of this stored water into the main drum will bring the drum water level from an intermediate value (shown at 16) to a relatively high steam generating level for the boiler, while discharge into the tank 23 of water sufficient completely to fill same will lower the main drum water from intermediate level 16 to a relatively low steam generating level for the boiler.

The tank's elevation substantially above the boiler water level provides an effective gravity head tending to return water from the tank into the boiler. By reason, moreover, of the tank's horizontal mounting given change increments in boiler water level result from small change increments in tank water level. This minimizes tank level variation during operation of the steam generator. This is advantageous because it maintains a more nearly constant differential water level head between drum water level and surge tank water level.

Thus when water interchange occurs between drum and tank the flow rate is essentially constant causing time of steam pressure recovery to differ only slightly. This results in more accurate steam pressure control at all steam loads and especially with increasing load near the maximum load because the sustained water head produces nearly the same flow rate then as it would at lower loads. This desirable condition is not obtained with a tank in the vertical plane because the change of head becomes considerable when boiler water level is low and surge tank level is high.

Water transfers as mentioned above are governed by surge tank valve A—B—C—D. Those valves, in turn, may be controlled in any suitable manner as will be more fully described at a later point herein.

*Reclaiming bleed water heat*

The specific resistance of the boiler water is a function of the amount of dissolved salts and also of the temperature of the water. Enough water must be bled off through valve M and conduit 30 to maintain the concentration of salts and hence the water resistance at the desired point. The bleed water is much more highly concentrated than the feed water and the proportion of bleed thus depends on the concentration of the feed water admitted at 15.

Typically, bleed valve M will be provided with control facilities which automatically govern the valve opening in such manner that the water in main boiler drum 10 will at all times be kept within the electrical conductivity range desired. Illustratively shown for this purpose are a water-sampling element 31 plus conductivity-responsive control means CC for valve M organized to function as described by copending application Serial No. 763,700, filed by Mittendorf and Paulison, as earlier mentioned.

Too high a water conductivity (resulting from an over-concentration of salts in the boiler water) is registered by element CC thereby effecting (through conventional pneumatic means as described by the just-mentioned copending application, Serial No. 763,700) an opening of bleed valve M. This makes room in the main drum 10 for sufficiently more fresh water from feed pipe 21 to dilute the concentration and again lower the conductivity. Once restored to the proper range element CC registers the corrected condition and effects a closing of valve M until such time as the water conductivity may again become too high. In that event the corrective cycle just outlined is again repeated.

In order to maintain the water in surge tank 23 at close to boiler temperature, I have arranged to have the bleed from the main drum 10 pass from conduit 30 through a heating coil 34 that is submerged in the surge tank water. The elements of this coil 34 may with advantage extend lengthwise of tank 23, zig-zagging through a relatively long submerged path to the bleed outlet 35. Other arrangements providing heat-transfer surface of requisite magnitude are of course useable.

Normally there will be relatively little interchange of heat between the heating coil 34 and the surge tank water because the two are at substantially the same temperature. This normalcy assumes comparatively frequent transfers of water between the surge tank and the main boiler drum 10. Under certain conditions, however, these transfers of water may be so infrequent as to allow (in the absence of any heating means) the surge tank water to cool considerably. Were it then to be discharged from tank 23 into the main drum its "unheated" temperature would retard rapid generation of steam.

My illustrated provision of heating coil 34 overcomes this difficulty. All bleed water which leaves the main drum 10 through valve M circulates through coil 34 and by thus causing the stored water in surge tank 23 to absorb the bleed water heat thereby assures that the stored water temperature will at all times be maintained close to that of the main boiler water 12.

Control of surge tank valves A—B—C—D

In the illustrative arrangement shown the four surge tank valves A—B—C—D are controlled jointly by boiler water level meter WL, by steam pressure meter SP and by a surge tank water level meter TL; all in the manner disclosed and claimed by earlier mentioned co-pending application Serial No. 763,700, filed by Mittendorf and Paulison concurrently herewith.

Figure 3:
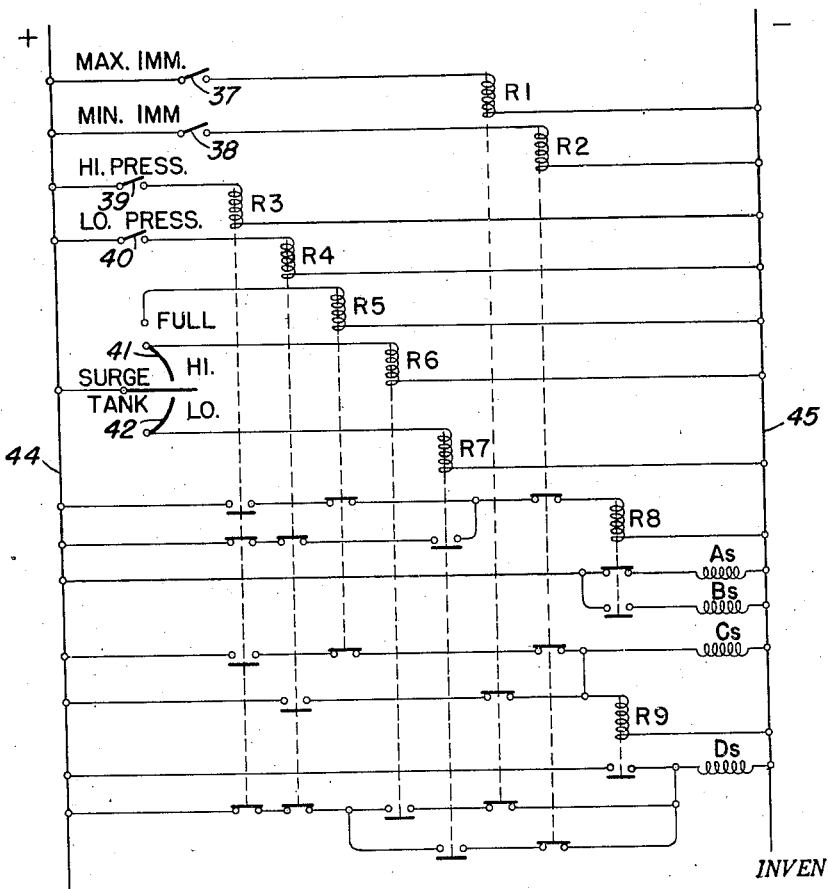
Fig. 3 is an electrical control diagram for the four valves with which the generator surge tank of Fig. 1 is shown as being equipped.

Participating in this control are three sets of electrical contacts 37—38, 39—40, and 41—42 respectively carried by metering devices WL, SP and TL as shown in Fig. 1. These several contacts govern electrical relays R1 through R9 included in the control-circuit system of Fig. 3. Those relays, in turn, control the energization of solenoids As—Bs—Cs—Ds by which the openings and closings of surge tank valves A—B—C—D are respectively governed. In the arrangement shown each of the named valves remains closed as long as its solenoid is de-energized and opens only when current from circuit 44—45 is passed through the valve solenoid.

The valve-control plan here illustrated has been reproduced from Mittendorf-Paulison application Serial No. 763,700. Under that plan, certain operating conditions of the electrical steam generator are accompanied by no transfer of water between the boiler drum 10 and the surge tank 23; other conditions are accompanied by water flow from the boiler drum to the tank at either a fast (through valve C and D) or a slow (through valve D only) rate; and still other conditions are accompanied by water flow from the surge tank to the boiler drum also at either a fast or a slow rate. Following each boiler level adjusting transfer, moreover, the water in surge tank 23 is restored to an intermediate level, thereby safeguarding the tank against continued keeping of either too little or too much water therein.

Since this particular control plan per se is not embraced by the present invention, its operating details will not here be described, such information being fully set forth by Mittendorf-Paulison's co-pending application Serial No. 763,700 earlier mentioned.

Summary

Although my new surge tank organization is here disclosed as applied to an electrical steam generator of a particular construction having water-level, bleed and tank-valve controls accomplished in particular manners, it will be understood that such construction and controls are illustrative rather than restrictive and that my inventive improvements therefore are useable wherever electric boiler operating problems solvable by them may be encountered.

From the foregoing it will accordingly be seen that I have improved the performance of electric steam generators which have surge tanks for facilitating electrode-immersion control; that I have minimized variation in tank water level during interchange of water between the boiler and the tank; and that I have usefully reclaimed the heat content of the bleed water which is withdrawn from the electric boiler to keep water conductivity within proper limits.

My inventive improvements are therefore extensive in their adaption and are not to be restricted to the specific form here disclosed by way of illustration.

What I claim is:

1. In combination, an electric steam generator comprising a boiler, means for admitting water thereinto, heating means for said water including an electrode immersed therein to a depth dependent upon the water level in the boiler whereby the rate of steam generation increases as that level is raised and decreases as that level is lowered, a surge tank external to and above the top water level in said boiler, a conduit connecting the lower portion of said surge tank with the lower portion of said boiler, electrode-immersion-control means for causing water to flow through said conduit from said boiler to said tank at times and from said tank to said boiler at other times, bleed means responsive to water conductivity and effective to drain hot water from the boiler, a heating conduit within said surge tank for submergence by the water therein contained, and means for passing said hot bleed water through that conduit whereby to transfer the heat therein to the tank water surrounding the conduit.

2. In an electric steam generator, the combination of an upright boiler having therein a water-heating electrode immersed to a depth dependent upon the boiler water level, a surge tank of axial length substantially greater than the tank diameter mounted external to said upright boiler above the top water level therein with the tank axis substantially horizontal, a conduit connecting the lower portion of said tank with the lower portion of said boiler, electrode-immersion-control means for causing water to flow through said conduit from said boiler to said tank at times and from said tank to said boiler at other times, bleed means effective at times to drain hot water from the boiler, a heating conduit within said surge tank for submergence by the water therein contained, and means for passing said hot bleed water through that conduit whereby to transfer the heat therein to the tank water surrounding the conduit, said horizontal positioning of the surge tank enabling given change increments in boiler water level to result from small change increments in tank water level thereby minimizing tank level variation during operation of the steam generator.

HARVEY C. MITTENDORF.

REFERENCES CITED

The following references are of record in the file of this patent:

UNITED STATES PATENTS

| Number | Name | Date |
| --- | --- | --- |
| Re. 16,935 | Noll | Apr. 17, 1928 |
| 1,503,972 | Berg | Aug. 5, 1924 |
| 1,504,928 | Bergeon | Aug. 12, 1924 |
| 1,786,113 | Henszey | Dec. 23, 1930 |
| 1,812,050 | Kensig | June 30, 1931 |
| 1,868,431 | Rice | July 19, 1932 |
| 1,895,635 | McDonald | Jan. 31, 1933 |
| 1,904,900 | Kriegsheim | Apr. 18, 1933 |
| 1,971,816 | Hecht et al. | Aug. 28, 1934 |
| 2,185,786 | Eaton | Jan. 2, 1940 |